US008087253B2

(12) United States Patent
Ning et al.

(10) Patent No.: US 8,087,253 B2
(45) Date of Patent: Jan. 3, 2012

(54) METHODS, APPARATUS AND SYSTEMS CONCERNING THE CIRCUMFERENTIAL CLOCKING OF TURBINE AIRFOILS IN RELATION TO COMBUSTOR CANS AND THE FLOW OF COOLING AIR THROUGH THE TURBINE HOT GAS FLOWPATH

(75) Inventors: Wei Ning, Greenville, SC (US); Stephen W. Tesh, Simpsonville, SC (US); Gunnar L. Siden, Greenville, SC (US); Bradley T. Boyer, Greenville, SC (US)

(73) Assignee: General Electric Company, Schenectady, NY (US)

( * ) Notice: Subject to any disclaimer, the term of this patent is extended or adjusted under 35 U.S.C. 154(b) by 563 days.

(21) Appl. No.: 12/274,568

(22) Filed: Nov. 20, 2008

(65) Prior Publication Data

US 2010/0122538 A1    May 20, 2010

(51) Int. Cl.
*F02C 7/12* (2006.01)
(52) U.S. Cl. .......................................... 60/806; 60/39.37
(58) Field of Classification Search ............. 60/772, 60/805, 806, 39.37; 415/116, 199.5
See application file for complete search history.

(56) References Cited

U.S. PATENT DOCUMENTS

| | | | | |
|---|---|---|---|---|
| 2,743,579 A | * | 5/1956 | Gaubatz | 60/804 |
| 3,182,453 A | * | 5/1965 | Probert et al. | 60/759 |
| 3,608,310 A | * | 9/1971 | Vaught | 60/752 |
| 3,953,148 A | * | 4/1976 | Seippel et al. | 415/199.5 |
| 4,739,621 A | * | 4/1988 | Pettengill et al. | 60/757 |
| 5,486,091 A | * | 1/1996 | Sharma | 415/194 |
| 5,937,634 A | * | 8/1999 | Etheridge et al. | 60/39.27 |
| 6,402,458 B1 | * | 6/2002 | Turner | 415/1 |
| 6,554,562 B2 | | 4/2003 | Dudebout et al. | |
| 2010/0054922 A1 | * | 3/2010 | Ning et al. | 415/129 |
| 2010/0054929 A1 | * | 3/2010 | Ning et al. | 415/189 |
| 2010/0111684 A1 | * | 5/2010 | Ning et al. | 415/193 |

* cited by examiner

*Primary Examiner* — Louis Casaregola
*Assistant Examiner* — Phutthiwat Wongwian
(74) *Attorney, Agent, or Firm* — Mark E. Henderson; Ernest G. Cusick; Frank A. Landgraff

(57) ABSTRACT

A method of operating a turbine engine, wherein the turbine engine includes a compressor, a combustor, a turbine, a plurality of successive axially stacked stages that include a row of circumferentially spaced stator blades and circumferentially spaced rotor blades, and a plurality of circumferentially spaced injection ports disposed upstream of a first row of stator blades in the turbine; the injection ports comprising a port through which cooling air is injected into the hot-gas path of the turbine, the method comprising: configuring the stator blades in the first row of stator blades such that the circumferential position of a leading edge of one of the stator blades is located within +/−15% pitch of the first row of stator blades of the circumferential location of the injection port midpoint of at least a plurality of the injection ports.

15 Claims, 11 Drawing Sheets

METHODS, APPARATUS AND SYSTEMS CONCERNING THE CIRCUMFERENTIAL CLOCKING OF TURBINE AIRFOILS IN RELATION TO COMBUSTOR CANS AND THE FLOW OF COOLING AIR THROUGH THE TURBINE HOT GAS FLOWPATH

BACKGROUND OF THE INVENTION

This present application relates to turbine engines. More specifically, but not by way of limitation, the present application relates to the circumferential positioning of airfoils in relation to the positioning of cooling air ejection ports and the flowpath of cooling air through the turbine hot gas path section of the engine.

A gas turbine engine typically includes a compressor, a combustor, and a turbine. The compressor and turbine generally include rows of airfoils or blades that are axially stacked in stages. Each stage generally includes a row of circumferentially spaced stator blades, which are fixed, and a set of circumferentially spaced rotor blades, that rotate about a central axis or shaft. While there are other types of combustors, gas turbine engines often have cylinder shaped combustors, which are often called "can combustors." As described in more detail below, a can combustor assembly generally includes a plurality of individual "cans" that are circumferentially spaced about the downstream end of the compressor.

Generally, a gas turbine engine operates as follows. Rotor blades in the compressor rotate about the shaft to compress a flow of air. The supply of compressed air is split and directed to the individual combustion cans, within which the supply of compressed air is used to combust a supply of fuel. The resulting flow of hot gases from the combustion exits the combustion cans and is directed into the turbine, where the pressurized flow is expanded. The expansion through the turbine induces the turbine rotor blades to rotate about the shaft. In this manner, the energy contained in the fuel is converted into the mechanical energy of the rotating turbine rotor blades, which may be used to rotate the rotor blades of the compressor, thus producing the flow of compressed air, and the coils of a generator to generate electricity. During operation, because of the extreme temperatures, the velocity of the working fluid, and, for the rotor blades, the rotational velocity of the rotating parts, the airfoils through both the compressor and the turbine are highly stressed parts. As a result, in general, reducing the thermal load on the airfoils in the turbine is a continuing objective.

To reduce the thermal load, cooling air is extracted from the compressor and passed through cooling channels that are formed within the rotor and stator blades. After passing through the cooling channels of the airfoils, the cooling air generally is dumped back into the main flow through the turbine. However, the cooling air has a negative impact on the efficiency of the engine. Therefore, the amount of cooling air used to cool the turbine airfoils in this manner should, to the extent possible, be minimized.

In most industrial gas turbine engines, cooling air is also used to cool the combustion cans and transition pieces of the combustor assembly. Typically, air is taken from the compressor and passed through the gaps between the individual cans. After passing between the combustion cans, any flow not utilized in the combustion process is dumped back into the main flow. This generally takes place at the beginning of the turbine section of the engine and just upstream of the row of stator blades in the first stage. More particularly, the transition piece aft frame cooling air reenters the main flow at discrete circumferential locations defined by the area between two neighboring combustion cans. However, conventional gas turbine design does not fully utilize the capacity of this air to cool the stator blades in the leading stages of the turbine. Given that it is often the inability of present materials to withstand higher firing temperatures that prevents more efficient gas turbine engines from being constructed, new methods of operation, apparatus and/or assemblies that more fully utilize this type of compressor supplied cooling air would be greatly desired. Further, new methods of operation, apparatus and/or gas turbine assemblies that minimize the amount of cooling air bled from the compressor to pass through the airfoils and dumped back into the main flow of the working fluid would increase turbine engine efficiency and, thus, also be desired.

BRIEF DESCRIPTION OF THE INVENTION

The present application thus describes a method of operating a turbine engine, wherein the turbine engine includes a compressor, a combustor, a turbine, a plurality of successive axially stacked stages that include a row of circumferentially spaced stator blades and circumferentially spaced rotor blades, and a plurality of circumferentially spaced injection ports disposed upstream of a first row of stator blades in the turbine; the injection ports comprising a port through which cooling air is injected into the hot-gas path of the turbine, the method comprising: configuring the stator blades in the first row of stator blades such that the circumferential position of a leading edge of one of the stator blades is located within +/−15% pitch of the first row of stator blades of the circumferential location of the injection port midpoint of at least a plurality of the injection ports.

The present application further describes an assembly in a turbine engine, the turbine engine includes a compressor, a combustor, a turbine, a plurality of successive axially stacked stages that include a row of circumferentially spaced stator blades and circumferentially spaced rotor blades; the assembly comprising: a plurality of circumferentially spaced injection ports disposed upstream of a first row of stator blades in the turbine, the injection ports comprising a port through which cooling air is injected into the hot-gas path of the turbine; and a first row of stator blades configured such that the circumferential position of a leading edge of one of the stator blades is located within +/−15% pitch of the first row of stator blades of the circumferential location of the injection port midpoint of at least a plurality of the injection ports.

The present application further describes an assembly in a turbine engine, the turbine engine includes a compressor, a combustor, a turbine, a plurality of successive axially stacked stages that include a row of circumferentially spaced stator blades and a row of circumferentially spaced rotor blades; the assembly comprising: a plurality of circumferentially spaced injection ports disposed upstream of a first row of stator blades in the turbine, the injection ports comprising a port through which a cooling jet is injected into the hot-gas path of the turbine; and a first row of stator blades configured such that the circumferential position of a leading edge of one of the stator blades is located within +/−15% pitch of the first row of stator blades of the circumferential location at which at least a majority of the cooling jets is determined to enter the first row of stator blades during a selected operating condition.

These and other features of the present application will become apparent upon review of the following detailed description of the preferred embodiments when taken in conjunction with the drawings and the appended claims.

BRIEF DESCRIPTION OF THE DRAWINGS

These and other objects and advantages of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
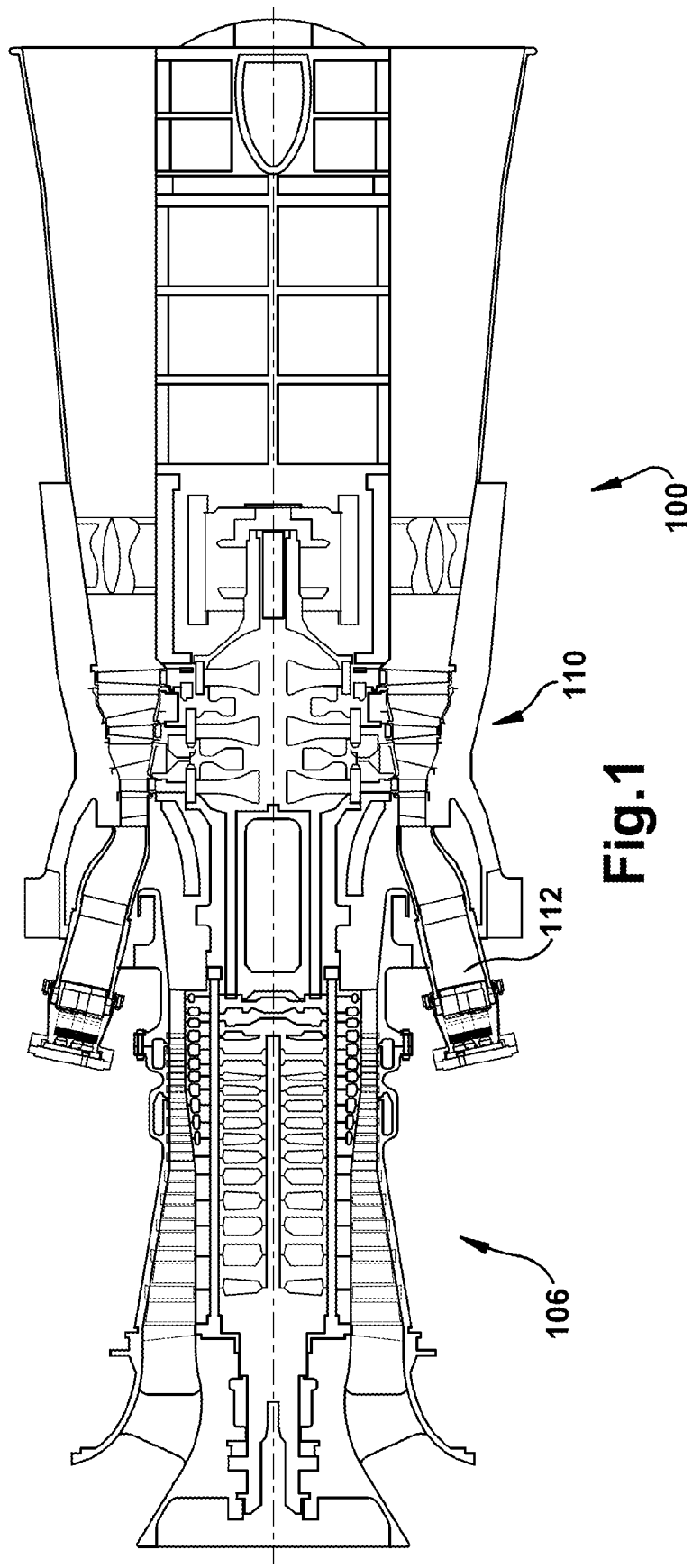
FIG. 1 is a schematic representation of an exemplary turbine engine in which embodiments of the present application may be used.

Referring now to the figures, FIG. 1 illustrates a schematic representation of a gas turbine engine 100. In general, gas turbine engines operate by extracting energy from a pressurized flow of hot gas that is produced by the combustion of a fuel in a stream of compressed air. As illustrated in FIG. 1, gas turbine engine 100 may be configured with an axial compressor 106 that is mechanically coupled by a common shaft or rotor to a downstream turbine section or turbine 110, and a combustion system 112, which, as shown, is a can combustor that is positioned between the compressor 106 and the turbine 110. Note that the following invention may be used in all types of turbine engines, including gas turbine engines, steam turbine engines, aircraft engines, and others. Hereinafter, the invention will be described in relation to a gas turbine engine. This description is exemplary only and not intended to be limiting in any way.

Figure 2:
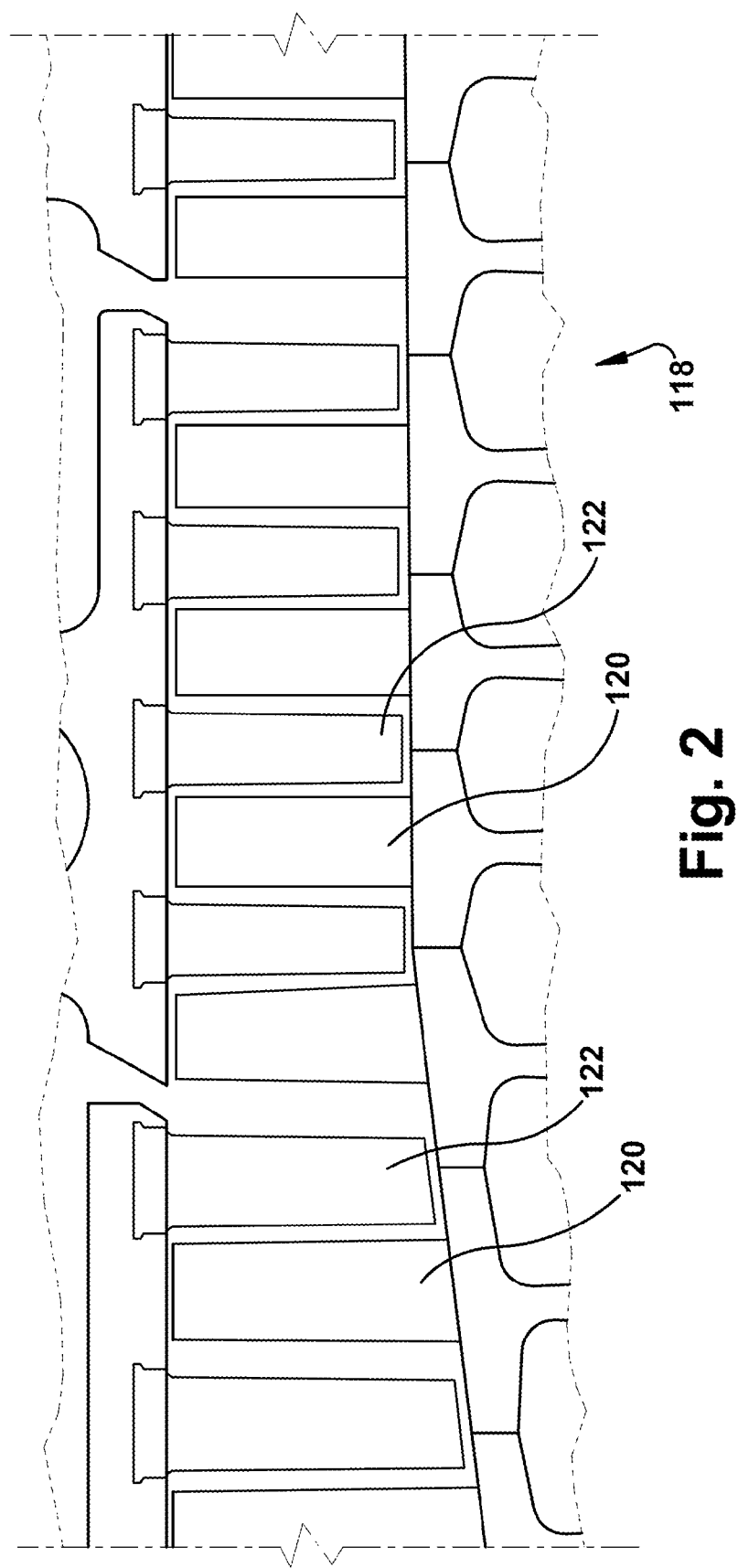
FIG. 2 is a sectional view of an exemplary compressor that may be used in the gas turbine engine of FIG. 1.

FIG. 2 illustrates a view of an exemplary multi-staged axial compressor 118 that may be used in gas turbine engine. As shown, the compressor 118 may include a plurality of stages. Each stage may include a row of compressor rotor blades 120 followed by a row of compressor stator blades 122. Thus, a first stage may include a row of compressor rotor blades 120, which rotate about a central shaft, followed by a row of compressor stator blades 122, which remain stationary during operation. The compressor stator blades 122 generally are circumferentially spaced one from the other and fixed about the axis of rotation. The compressor rotor blades 120 are circumferentially spaced about the axis of the rotor and rotate about the shaft during operation. As one of ordinary skill in the art will appreciate, the compressor rotor blades 120 are configured such that, when spun about the shaft, they impart kinetic energy to the air or working fluid flowing through the compressor 118. As one of ordinary skill in the art will appreciate, the compressor 118 may have many other stages beyond the stages that are illustrated in FIG. 2. Each additional stage may include a plurality of circumferential spaced compressor rotor blades 120 followed by a plurality of circumferentially spaced compressor stator blades 122.

Figure 3:
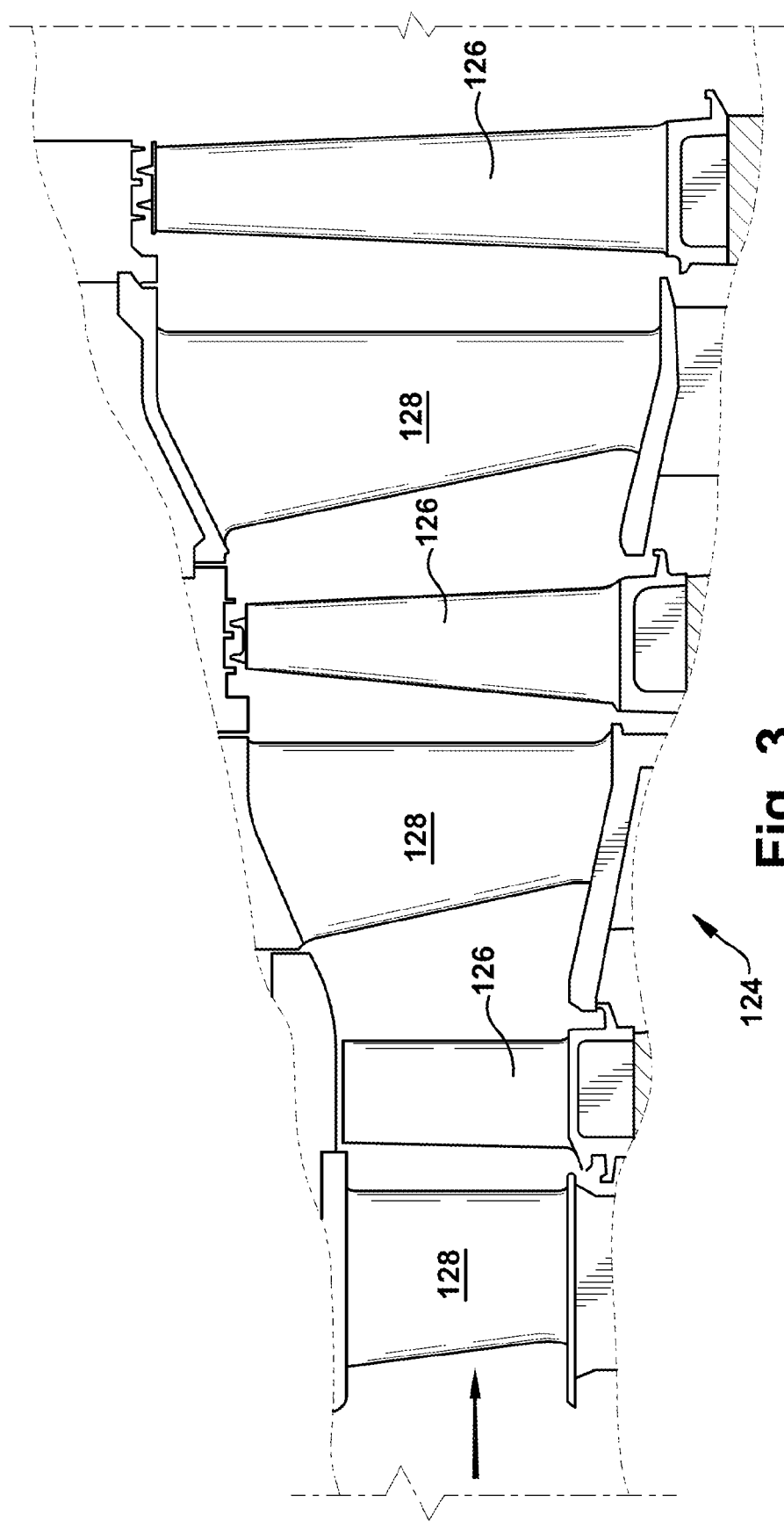
FIG. 3 is a sectional view of an exemplary turbine that may be used in the gas turbine engine of FIG. 1.

FIG. 3 illustrates a partial view of an exemplary turbine section or turbine 124 that may be used in a gas turbine engine. The turbine 124 may include a plurality of stages. Three exemplary stages are illustrated, but more or less stages may be present in the turbine 124. A first stage includes a plurality of turbine buckets or turbine rotor blades 126, which rotate about the shaft during operation, and a plurality of nozzles or turbine stator blades 128, which remain stationary during operation. The turbine stator blades 128 generally are circumferentially spaced one from the other and fixed about the axis of rotation. The turbine rotor blades 126 may be mounted on a turbine wheel (not shown) for rotation about the shaft (not shown). A second stage of the turbine 124 is also illustrated. The second stage similarly includes a plurality of circumferentially spaced turbine stator blades 128 followed by a plurality of circumferentially spaced turbine rotor blades 126, which are also mounted on a turbine wheel for rotation. A third stage also is illustrated, and similarly includes a plurality of circumferentially spaced turbine stator blades 128 and turbine rotor blades 126. It will be appreciated that the turbine stator blades 128 and turbine rotor blades 126 lie in the hot gas path of the turbine 124. The direction of flow of the hot gases through the hot gas path is indicated by the arrow. As one of ordinary skill in the art will appreciate, the turbine 124 may have many other stages beyond the stages that are illustrated in FIG. 3. Each additional stage may include a plurality of circumferential spaced turbine stator blades 128 followed by a plurality of circumferentially spaced turbine rotor blades 126.

Note that as used herein, reference, without further specificity, to "rotor blades" is a reference to the rotating blades of either the compressor 118 or the turbine 124, which include both compressor rotor blades 120 and turbine rotor blades 126. Reference, without further specificity, to "stator blades" is a reference to the stationary blades of either the compressor 118 or the turbine 124, which include both compressor stator blades 122 and turbine stator blades 128. The term "airfoil" will be used herein to refer to either type of blade. Thus, without further specificity, the term "airfoil" is inclusive to all type of turbine engine blades, including compressor rotor blades 120, compressor stator blades 122, turbine rotor blades 126, and turbine stator blades 128.

Figure 4:
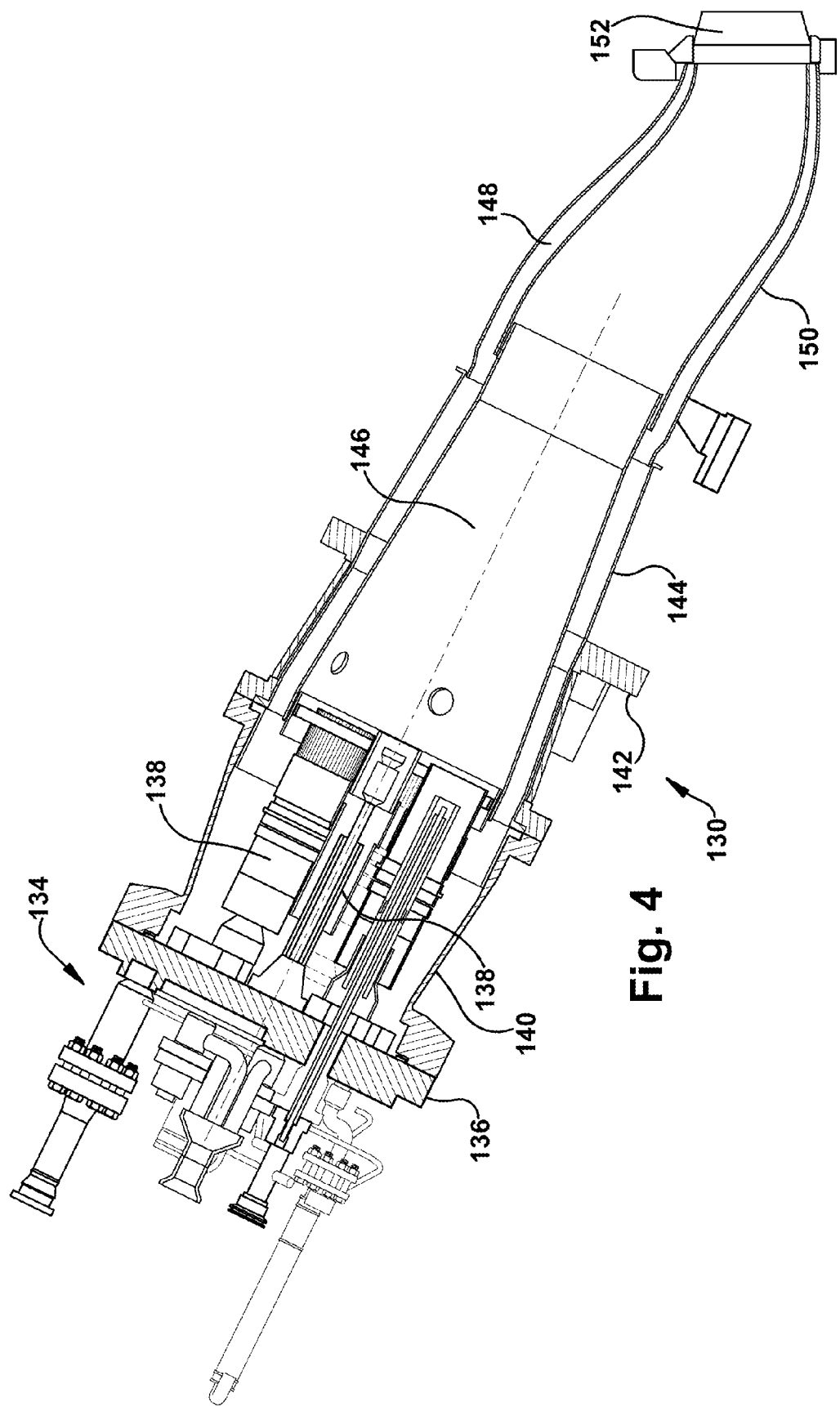
FIG. 4 is a sectional view of an exemplary can combustor that may be used in the gas turbine engine of FIG. 1.

FIG. 4 illustrates an exemplary can combustor 130 that may be used in a gas turbine engine in which an embodiment of the present invention may be employed. As one of ordinary skill in the art will appreciate, combustor can 130 may include a headend 134, which generally includes the various manifolds that supply the necessary air and fuel to the can combustor, and an end cover 136. A plurality of fuel nozzles 138 may be fixed to the end cover 136. As one of ordinary skill will appreciate, in gas turbine engines, fuel nozzles 138 deliver a mixture of fuel and air to the can combustor 130 for combustion. The fuel, for example, may be natural gas and the air may be compressed air supplied from an axial compressor (not shown in FIG. 4) that is part of the gas turbine engine. The fuel nozzles 138 may be located inside of a forward case 140 that attaches to the end cover 136 and encloses the fuel nozzles 138. As one of ordinary skill in the art will appreciate, downstream of the fuel nozzles 138, generally, an aft case 142 may enclose a flow sleeve 144. The flow sleeve 144, in turn, may enclose a liner 146. A transition piece 148 will transition the flow from a circular cross section to an annular cross section as it travels downstream to the turbine section (not shown in FIG. 4) of the gas turbine engine. A transition piece impingement sleeve 150 may enclose the transition piece 148, creating a channel between the transition piece impingement sleeve 150 and the transition piece assembly 148. At the downstream end of the transition piece 148, a transition piece aft frame 152 may direct the flow of the working fluid toward the airfoils that are positioned in the first stage of the turbine 110.

Figure 5:
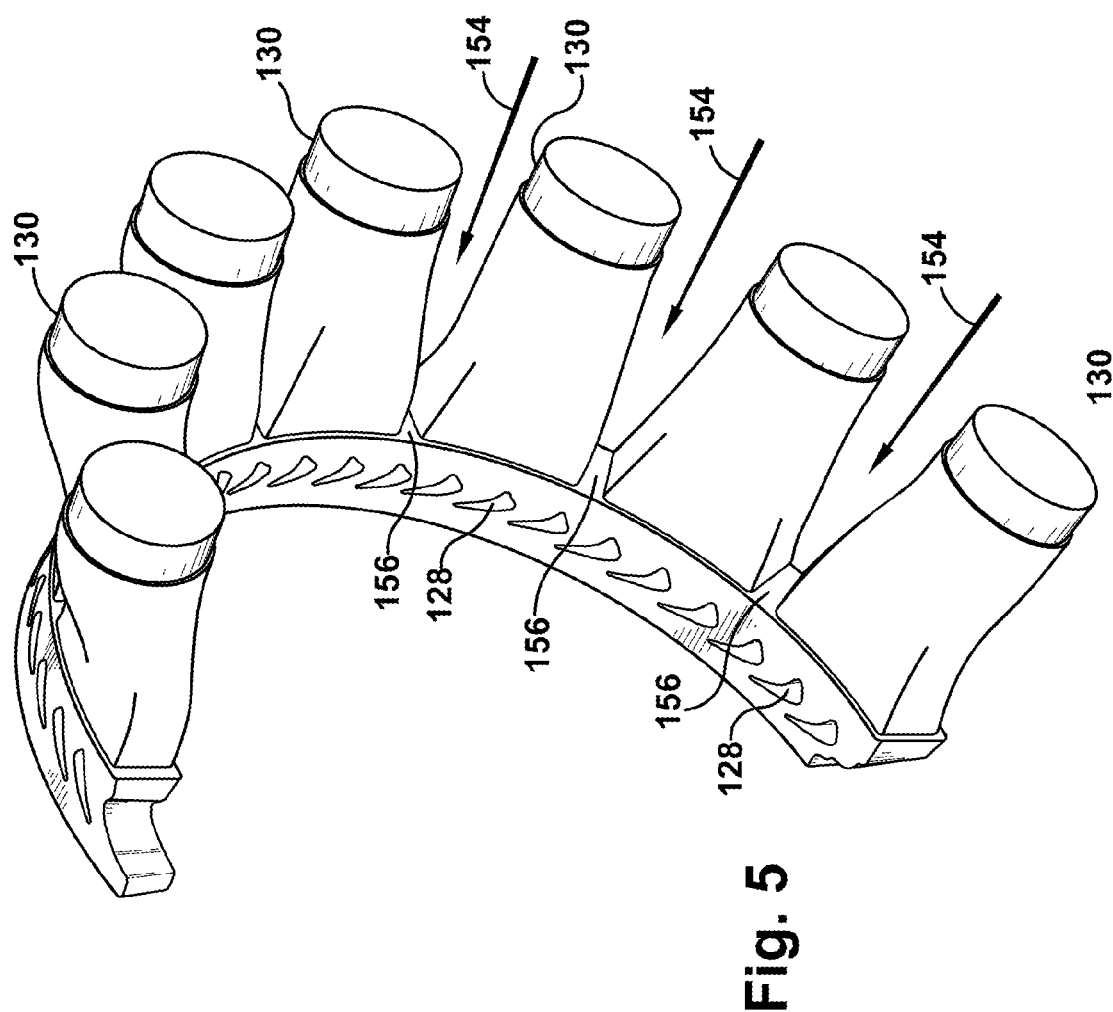
FIG. 5 is a partial perspective view of several can combustors as they generally are positioned in a gas turbine engine in which an exemplary embodiment of the present invention may operate.

FIG. 5 is a partial perspective view of several can combustors 130 as they might be positioned in a gas turbine. As described in more detail below, certain embodiments of the present application may be used in the combustion system shown in FIG. 5. As illustrated, several can combustors 130 may be spaced at regular intervals around the circumference of the turbine engine. The downstream ends of the can combustors 130, i.e., the transition pieces 148 and the transition piece aft frame 152, generally discharge the flow of working fluid onto the stator blades 128 of the first stage in the turbine 110.

As described, to reduce the thermal load on the rotor blades 126 and stator blades 128 of the turbine 110, cooling air often is extracted from the compressor 106 and passed through cooling channels (not shown) that are formed within the airfoils. After passing through the cooling channels of the airfoils, the air generally exits the airfoils through surface apertures and, thusly, reenters the main flow through the turbine 110. However, as one of ordinary skill in the art will appreciate, cooling air has a negative impact on engine efficiency. Therefore, the amount of cooling air used to cool the turbine airfoils in this manner should, to the extent possible, be minimized.

Cooling air also is used to cool the can combustors 130. Typically, air is taken from the compressor and passed through the space between the can combustors. The flow of cooling air between the can combustors 130 is represented in FIG. 5 by arrows 154. After passing between the can combustors 130, the transition piece aft frame cooling air generally is injected back into the main flow through injection ports 156 that reside between neighboring transition piece aft frame 152. When the cooling air is injected back into the main flow, the temperature differential between it and the main flow is generally significant. As used herein, injection port 156 is meant to describe a release point of cooling air in the flow of working fluid that occurs near the approximate nexus of the combustor 112 and the turbine 110, i.e., just upstream of the first stage in the turbine 110. As illustrated in FIG. 5, injection ports 156 may reside in the area between neighboring transition piece aft frames 152.

In use, the combustor can 130 may operate as follows. A supply of compressed air from an axial compressor may enter the can combustion 130 through small perforations or holes in the transition piece impingement sleeve 150. The compressed air may then move between the channel formed between the transition piece impingement sleeve 150 and the transition piece assembly 148, in the direction of the headend 134. The supply of compressed air may continue in that direction through the channel formed between the liner 146 and the flow sleeve 144. From there, the compressed air may flow into the volume bound by the forward case 140 and enter the fuel nozzles 138 through an inlet flow conditioner. At the fuel nozzles 138, generally, the supply of compressed air may be mixed with a supply of fuel, which is provided by a fuel manifold that connects to the fuel nozzles 138 through the end cover 136. The supply of compressed air and fuel is combusted as it exits the fuel nozzles 138, which creates a flow of rapidly moving hot gases that is directed downstream via the transition piece assembly 148 where it enters the turbine section 110, where the energy of the flow is generally converted into the mechanical energy of rotating turbine blade airfoils. Note that the above description of the can combustor 130 is meant to be exemplary only. The present invention may also be used with other types of can combustors or similar combustor assemblies.

A gas turbine engine of the nature generally described above may operate as follows. The rotation of compressor rotor blades 120 within the axial compressor 118 may compress a flow of air. In the combustor 112, energy may be released when the compressed air is mixed with a fuel and ignited. The resulting flow of hot gases from the combustor 112 then may be directed over the turbine rotor blades 126, which may induce the rotation of the turbine rotor blades 126 about the shaft, thus transforming the energy of the hot flow of gases into the mechanical energy of the rotating shaft. The mechanical energy of the shaft may then be used to drive the rotation of the compressor rotor blades 120, such that the necessary supply of compressed air is produced, and also, for example, a generator to produce electricity.

Figure 6:
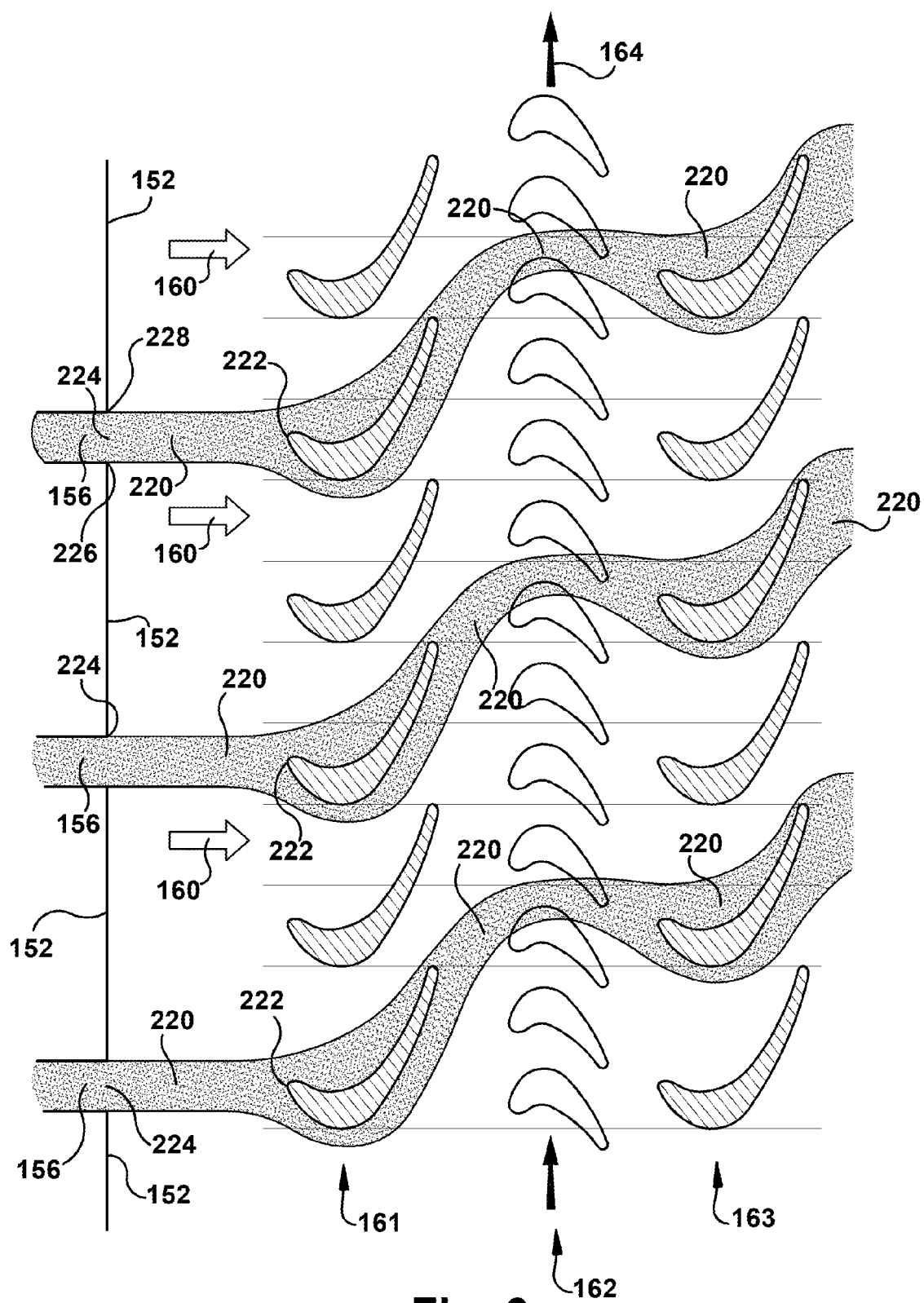
FIG. 6 is a schematic representation of the downstream end of the combustor assembly and the first three rows of airfoils according to an exemplary embodiment of the present invention.
Figure 7:
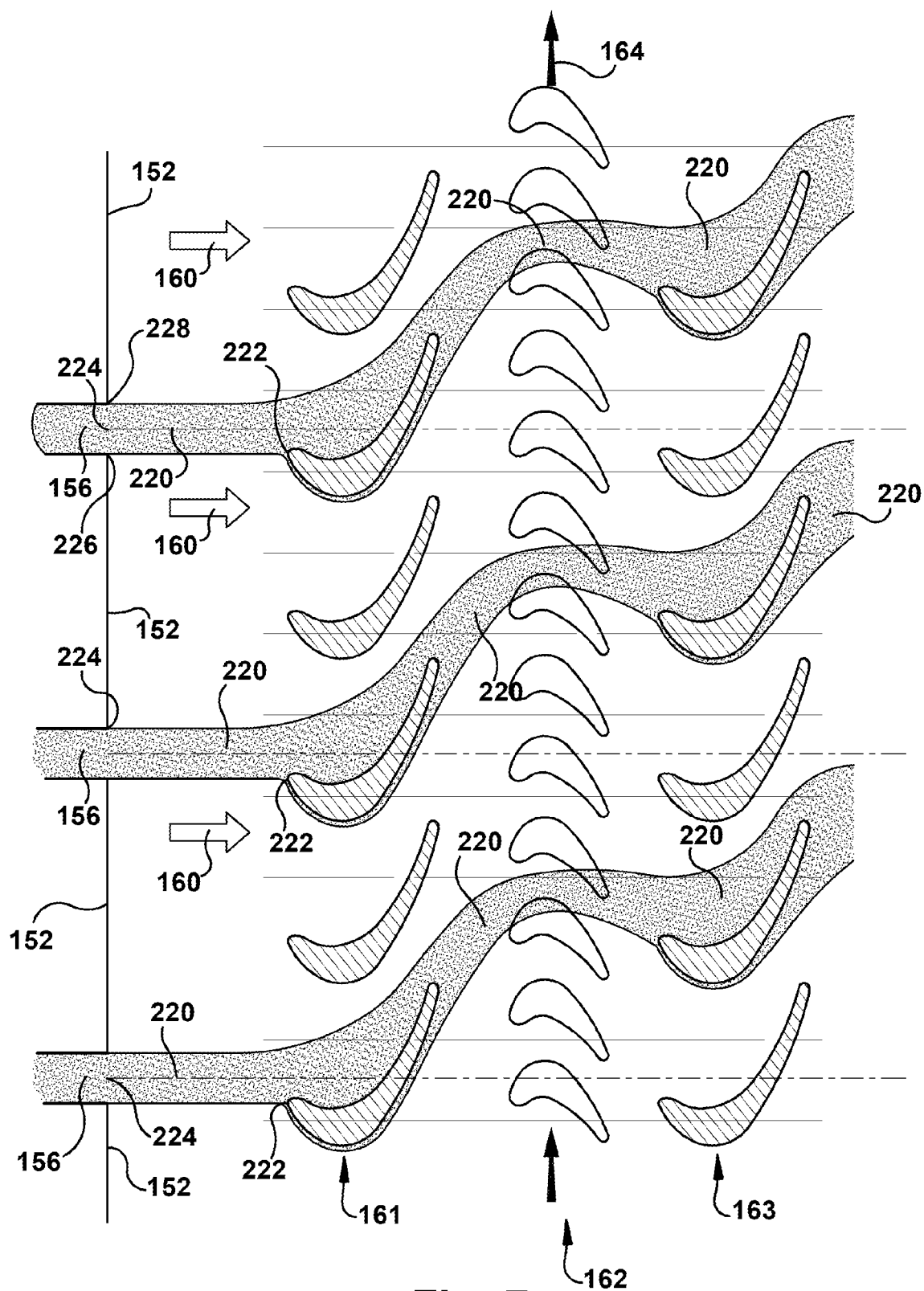
FIG. 7 is a schematic representation of the downstream end of the combustor assembly and the first three rows of airfoils according to an exemplary embodiment of the present invention.

FIGS. 6 and 7 are schematic representations of the downstream end of the combustor and the first three rows of airfoils. FIGS. 6 and 7 also illustrates a cooling air flow pattern through a design configuration according to exemplary embodiments of the present invention. As shown, injection ports 156 are defined between neighboring transition piece aft frame 152. Arrow 160 illustrates the direction of the flow of working fluid. A first row of turbine stator blades 161 is shown. As already described, stator blades are fixed and do not rotate during operation. Thus, the circumferential relationship between the stator blades 128 and the injection ports 156 (which also are fixed) does not change during operation. The first row of stator blades 161 is followed by a first row of turbine rotor blades 162. The flow of working fluid induces the first row of rotor blades 162 to rotate, the direction of which is indicated by arrow 164. The first row of rotor blades 162 is followed by a second row of stator blades 163, which, of course, is also fixed and does not rotate during operation.

Before continuing further with a description of the components within FIGS. 6 and 7, the clocking configurations of FIGS. 8 through 11 will be introduced and explained. This will allow the clocking configurations described as part of the current application to be clearly and specifically delineated. Note that the clocking configurations of FIGS. 8 through 11 concern clocking configurations between the airfoils of neighboring or nearby airfoil rows. As one of ordinary skill in the art will appreciate, the same principles that are used to describe clocking configurations between rows of airfoils may also be used to describe clocking configurations between, for example, a row of stator blades 128 and the injection ports 156.

Often, in both gas turbine compressors 106 and turbines 110, nearby or neighboring rows of airfoils may have substantially the same configuration, i.e., have the same number of similarly sized airfoils that are spaced similarly around the circumference of the row. When this is the case and, in addition, when two or more rows operate such that there is no relative motion between each (as would be the case, for example, between two or more rows of rotor blades or two or more rows of stator blades), the airfoils in these rows may be "clocked." As used herein, the term "clocked" or "clocking" refers to the fixed circumferential positioning of airfoils in one row in relation to the circumferential positioning of airfoils in nearby rows. As stated in the preceding paragraph, clocking may also be used to describe the fixed circumferential positioning of stationary airfoils and other stationary components.

FIGS. 8 through 11 illustrate simplified schematic representations of exemplary airfoils clocking configuration. These figures include three rows of airfoils 180 shown side-by-side. The two outer rows of airfoils 180 in FIGS. 8 through 11 may each represent a row of rotor blades and the row in the middle may represent a row of stator blades, or, as one of ordinary skill in the art will appreciate, the two outer rows may represent a row of stator blades and the row in the middle may represent a row of rotor blades. As one of ordinary skill in the art will appreciate, the two outer rows, whether they are stator blades or rotor blades, have substantially no relative motion between them (i.e., both remain stationary or both rotate at the same velocity during operation), whereas both of the outer rows have substantially the same relative motion in relation to the middle row (i.e., both of the outer rows rotate while the middle row remains stationary or both of the outer rows remain stationary while the middle row rotates). Further, as already described, for clocking to be most effective between the two outer rows, they each must be configured similarly. As such, the two outer rows of FIGS. 8 through 11 can be assumed to have substantially the same number of airfoils, and the airfoils on each row can be assumed to be similarly sized and spaced around the circumference of each row.

For the sake of the examples in FIGS. 8 through 11, the first outer row of airfoils will be referred to as a first airfoil row 184, the middle row of airfoils will be referred to as a second airfoil row 186, and the other outer row of airfoils will be referred to as a third airfoil row 188. The relative motion of the first airfoil row 184 and the third airfoil row 188 is indicated by arrows 190. The flow direction, which may represent the direction of flow through either the compressor 118 or the turbine 124, whatever the case may be, is indicated by arrows 192. Note that the exemplary rows of airfoils used in FIGS. 8 through 11 have been described with the terms "first", "second," and "third". This description is applicable only to the relative positioning of the illustrated rows in regard to the other rows in each of the figures, and is not indicative of overall positioning with respect to other rows of airfoils in the turbine engine. For example, other rows of airfoils may be positioned upstream of "first airfoil row 186" (i.e., the first airfoil row 186 is not necessarily the first row of airfoils in the turbine engine).

The "pitch" of a row of airfoils is used herein to refer to the measurement of the repeating pattern around the circumference of a particular row. Thus, the pitch may be described as the circumferential distance between, for example, the leading edge of an airfoil in a particular row and the leading edge of either of the neighboring airfoils in the same row. The pitch also, for example, may describe the circumferential distance between the trailing edge of an airfoil in a particular row and the trailing edge of either of the neighboring airfoils in the same row. It will be appreciated that in order for clocking to be more effective, the two rows generally will have similar pitch measurements. The first airfoil row 184 and the third airfoil row 188, as illustrated, have substantially the same pitch, which has been indicated in the third airfoil row 188 on FIG. 8 as distance 194. Note also that the clocking examples of FIGS. 8 through 11 are provided so that a consistent method of describing various clocking relationships between nearby or neighboring airfoil rows or between fixed airfoils and other fixed components may be delineated and understood. In general, as described more fully below, the clocking relationship between two rows will be given as the percentage of the pitch measurement. That is, it is the percentage of the pitch measurement that indicates the distance by which the airfoils on the two rows are clocked or offset. Thus, the percentage of the pitch measurement may describe the circumferential distance by which, for example, the leading edge of an airfoil on a particular row and the leading edge of a corresponding airfoil on a second row are offset from each other.

Figure 8:
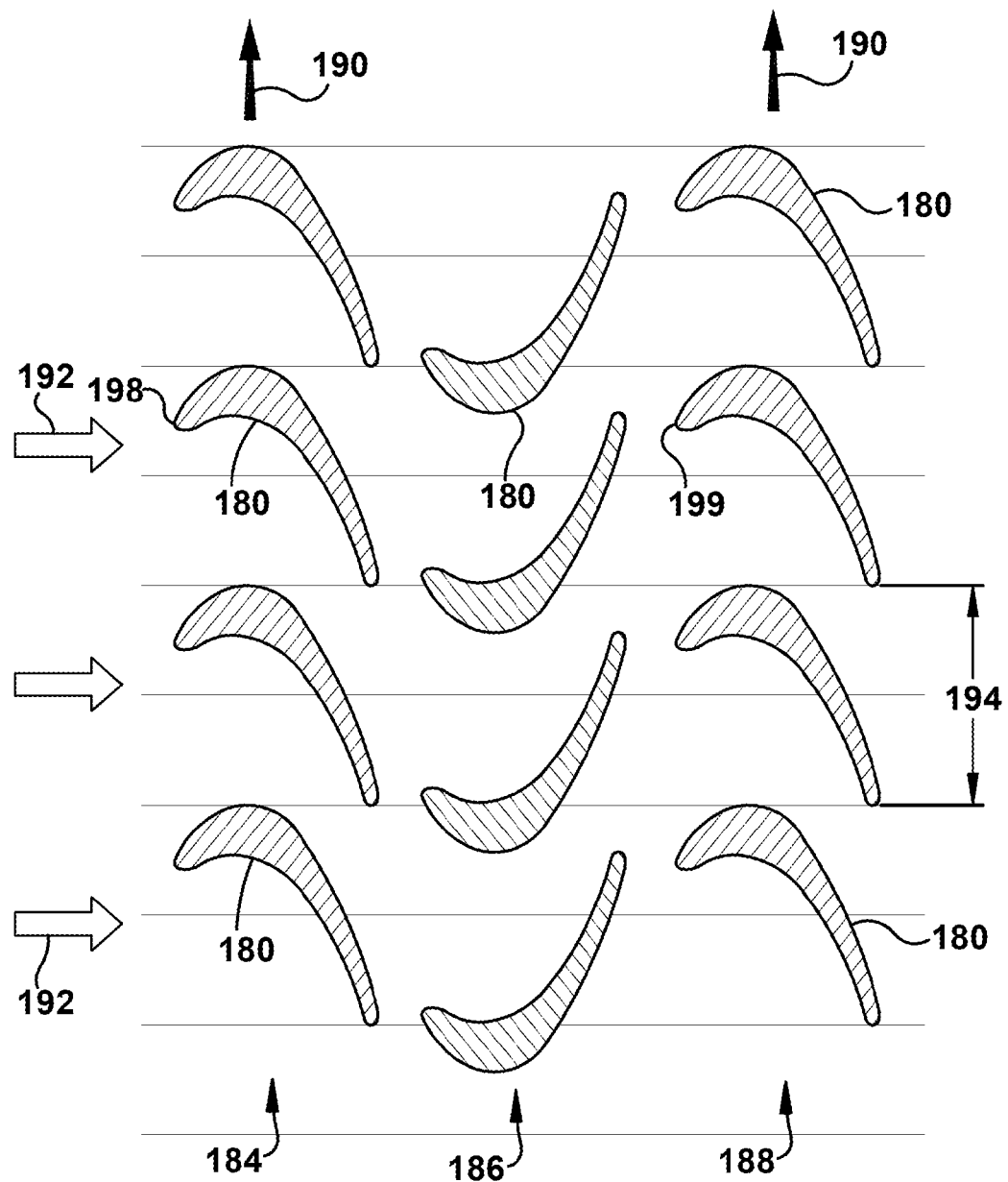
FIG. 8 illustrates a schematic representation of neighboring rows of airfoils illustrating an exemplary clocking relationship.

FIGS. 8 through 11 provide several examples of different clocking relationships between the two outer rows, i.e., the first airfoil row 184 and the third airfoil row 188. In FIG. 8, as will be appreciated, the third airfoil row 188 is offset by approximately 0% pitch in relation to the first airfoil row 184. Thus, as illustrated, the circumferential position of an airfoil 180 in the third airfoil row 188 lags the corresponding airfoil 180 in the first airfoil row 184 by an offset of approximately 0% of the pitch measurement, which, of course, means the airfoil 180 in the third airfoil row 188 maintains substantially the same circumferential position as the corresponding airfoil 180 in the first airfoil row 184. As such, a leading edge of an airfoil 180 in the first airfoil row 184 (one of which is identified with reference number 198) leads the leading edge of the corresponding airfoil 180 in the third airfoil row 188 (which is identified with reference number 199) by a circumferential distance of approximately 0% of the pitch measurement, which means that the leading edges of the corresponding airfoils occupy substantially the same circumferential position.

Figure 9:
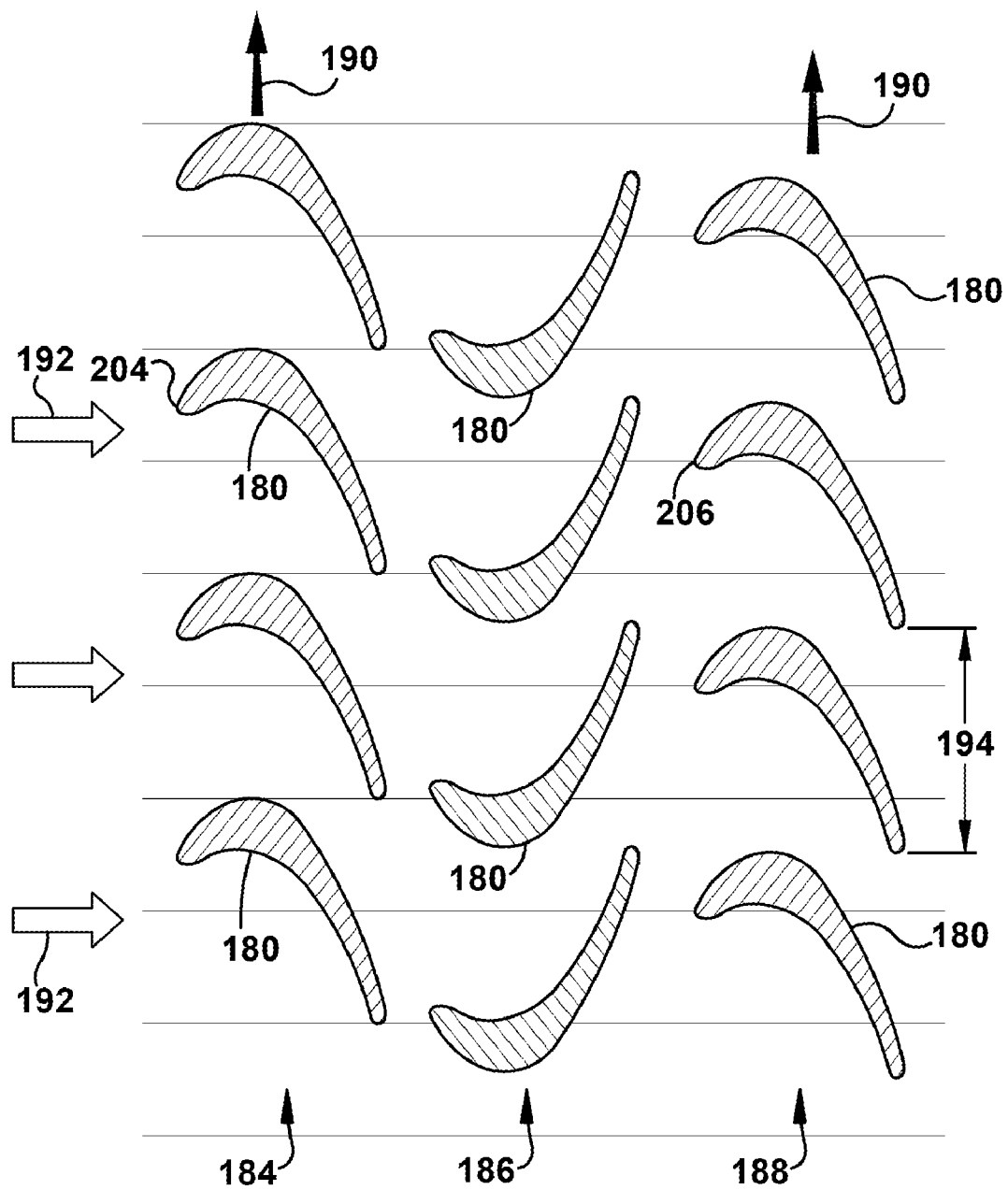
FIG. 9 illustrates a schematic representation of neighboring rows of airfoils illustrating an exemplary clocking relationship.

In FIG. 9, as will be appreciated, the third airfoil row 188 is offset by approximately 25% pitch in relation to the first airfoil row 184. Thus, as illustrated, the circumferential position of an airfoil 180 in the third airfoil row 188 lags (given the direction of relative motion of the outer rows) the corresponding airfoil 180 in the first airfoil row 184 by an offset of approximately 25% of the pitch measurement. As such, a leading edge of an airfoil 180 in the first airfoil row 184 (one of which is identified with reference number 204) leads the leading edge of the corresponding airfoil 180 in the third airfoil row 188 (which is identified with reference number 206) by a circumferential distance of approximately 25% of the pitch measurement.

Figure 10:
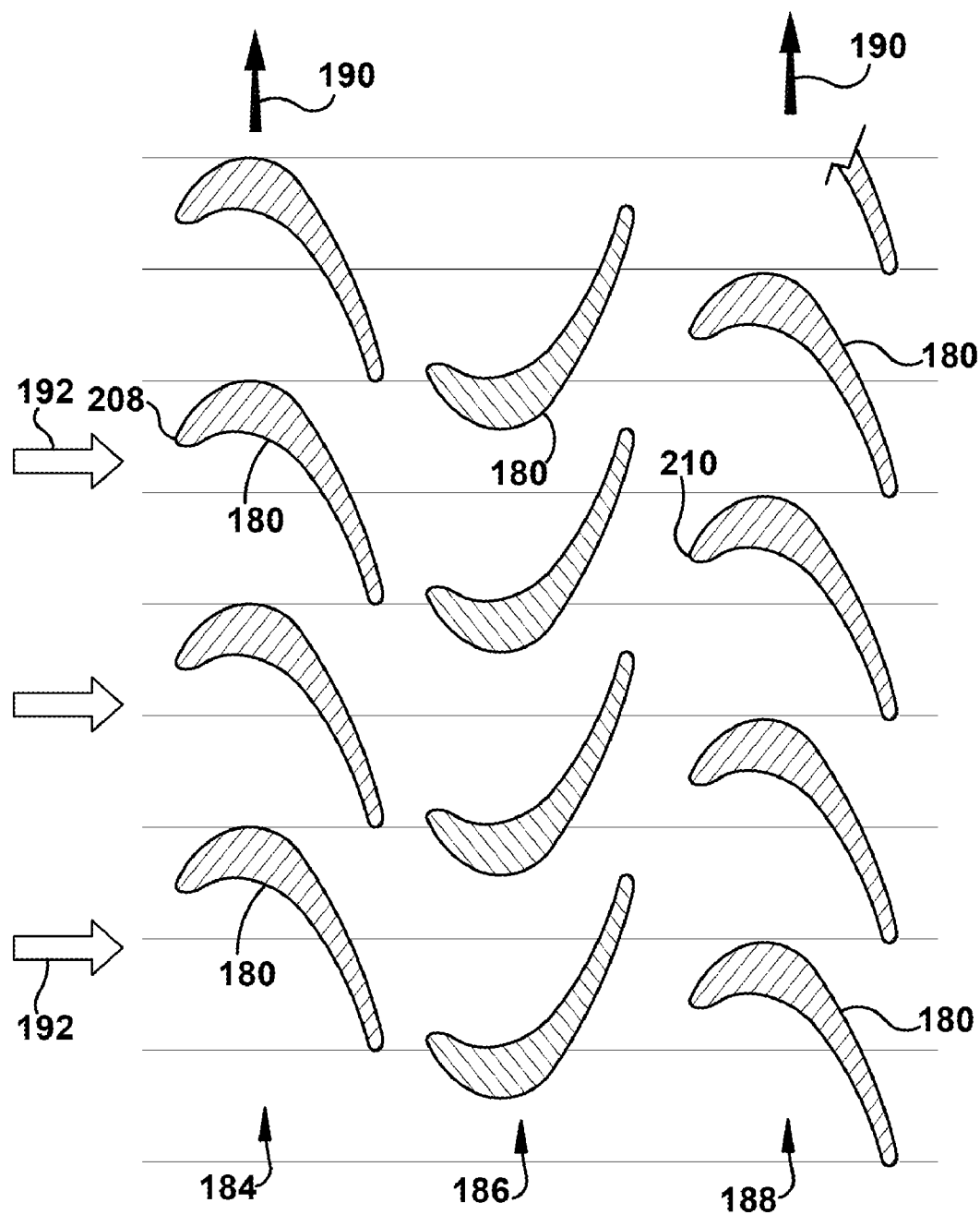
FIG. 10 illustrates a schematic representation of neighboring rows of airfoils illustrating an exemplary clocking relationship.

In FIG. 10, as will be appreciated, the third airfoil row 188 is offset by approximately 50% pitch in relation to the first airfoil row 184. Thus, as illustrated, the circumferential position of an airfoil 180 in the third airfoil row 188 lags (given the direction of relative motion of the outer rows) the corresponding airfoil 180 in the first airfoil row 184 by an offset of approximately 50% of the pitch measurement. As such, a leading edge of an airfoil 180 in the first airfoil row 184 (one of which is identified with reference number 208) leads the leading edge of the corresponding airfoil 180 in the third airfoil row 188 (which is identified with reference number 210) by a circumferential distance of approximately 50% of the pitch measurement.

Figure 11:
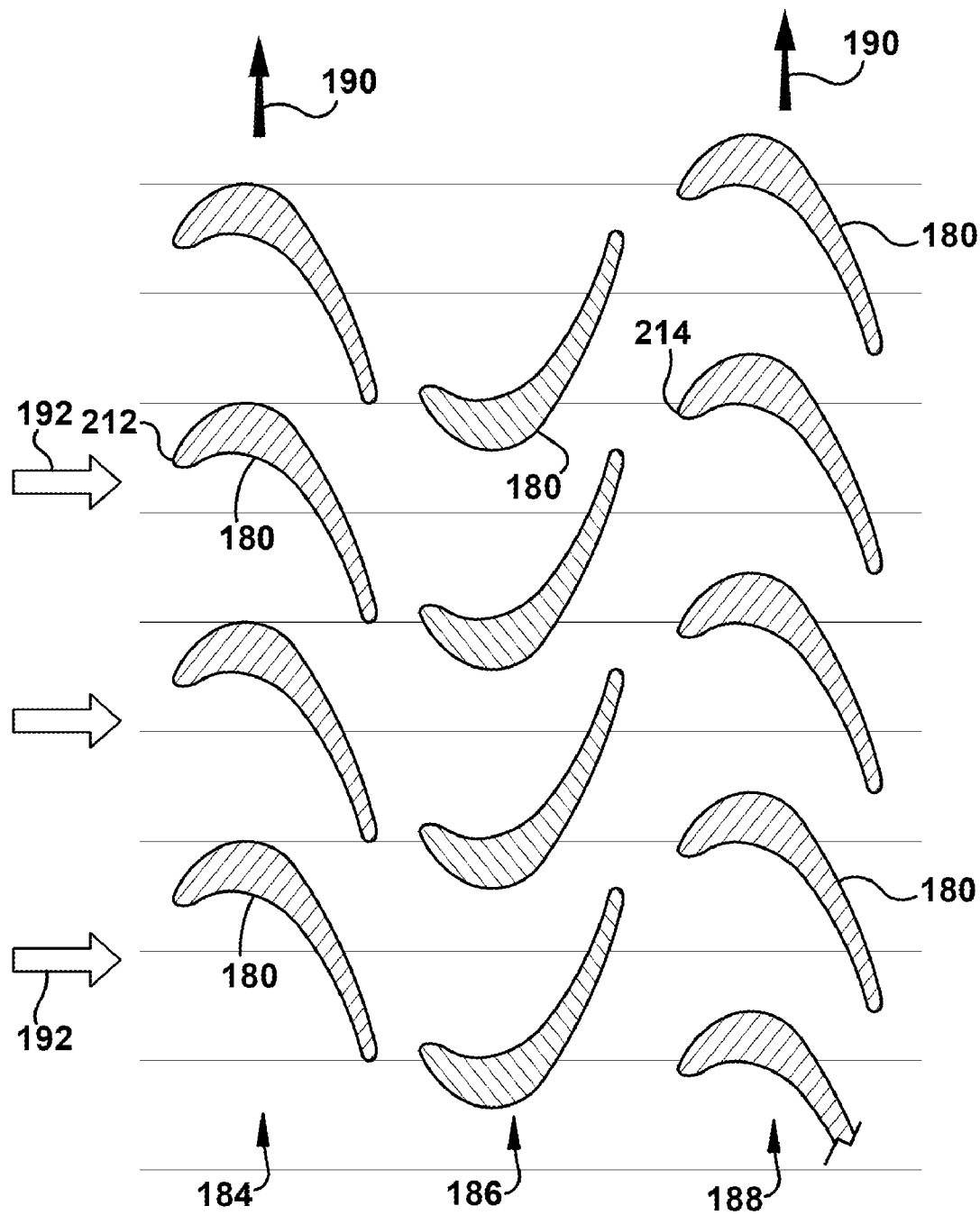
FIG. 11 illustrates a schematic representation of neighboring rows of airfoils illustrating an exemplary clocking relationship.

In FIG. 11, as will be appreciated, the third airfoil row 188 is offset by approximately 75% pitch in relation to the first airfoil row 184. Thus, as illustrated, the circumferential position of an airfoil 180 in the third airfoil row 188 lags (given the direction of relative motion of the outer rows) the corresponding airfoil 180 in the first airfoil row 184 by an offset of approximately 75% of the pitch measurement. As such, a leading edge of an airfoil 180 in the first airfoil row 184 (one of which is identified with reference number 212) leads the leading edge of the corresponding airfoil 180 in the third airfoil row 188 (which is identified with reference number 214) by a circumferential distance of approximately 75% of the pitch measurement. As one of ordinary skill in the art will appreciate, these clocking relationships are exemplary and intended to make clear a method for describing clocking relationships between several nearby or neighboring rows of airfoils or fixed airfoil rows and stationary components around them. Those of ordinary skill in the art will appreciate that other methods may be used to describe clocking relationships. The exemplary method used herein is not intended to be limiting in any way. Rather, it is the relative positioning between nearby components and airfoils, i.e., the clocking relationship, as delineated below and in the claims, that is significant, not the method by which the clocking relationship is described.

Through analytical modeling and experimental data, it has been discovered that certain clocking configurations provide certain operational advantages to the turbine stator blades 128. More specifically, it has been discovered that the thermal stresses experienced by some of the turbine stator blades 128 during operation, can be significantly affected by the clocking relationships these blades have with the location of a flow of cooling air, for example, the flow of cooling air through the injection ports 156. As described in more detail below, certain clocking relationships may decrease the thermal stresses experienced by some of the turbine stator blades in the initial stages of the turbine.

Returning to FIGS. 6 and 7, as already generally described, the downstream end of the combustor and the first three rows of airfoils are illustrated. Injection ports 156 are defined between neighboring transition piece aft frames 152, with arrows 160 illustrating the general direction of the flow of working fluid flowing from the transition piece aft frame 152. A first row of turbine stator blades 161 is shown. The stator blades are fixed, thus the circumferential relationship between the stator blades of and the injection ports 156 is fixed and does not change during operation. The first row of stator blades 161 is followed by a first row of turbine rotor blades 162. The flow of working fluid induces the first row of rotor blades 162 to rotate, the direction of which is indicated by arrow 164. The first row of rotor blades 162 is followed by a second row of stator blades 163, which, of course, is also fixed and does not rotate during operation.

It has been discovered that the flow of cooling air from the injection ports 156 does not immediately mix with the higher temperature main flow. In fact, it has been found through analytical modeling and experimental data that the flow of cooling air remains substantially intact, i.e., a significant temperature differential exists between the flow of the cooling air and the main flow, through the first several stages of the turbine 124. In FIGS. 6 and 7, the flow of cooling air is represented by the several shaded regions that originate in the injection ports 156. These shaded regions will be referred to as "cooling jets 220," though this description is not meant to be limiting. As shown, each of the cooling jets 220 flows in a general downstream direction until encountering the first airfoil row of stator blades 161. The stator blades 128 deflect the cooling jets 220 in an upward direction, given the orientation of FIGS. 6 and 7. This "upward" direction may be more specifically described as the direction around the circumference of the turbine that is the same direction as the rotation of the first row of turbine rotor blades 162 during operation (as indicated by arrow 164). The cooling jets 220 then may encounter the rotating blades of the first row of rotor blades 162. The upward deflection may generally flatten out as the cooling jets 220 move through the rotor blades such that the cooling jets 220 flow in a general axial direction (i.e., the same direction as arrow 160). The cooling jets 220 then may encounter the second row of stator blades 163, where the cooling jets 220 are again deflected "upward." This general flow pattern may continue through the first several rows of airfoils until the cooling jets 220 are generally mixed within the main flow of working fluid such that no significant temperature differences may be seen through the flow.

It has been discovered that certain clocking configurations of the stator blades with in the first few stages in relation to the injection ports 156 (or other such similar cooling air injection components) take better advantage of the cooling jets 220 such that the turbine engine may be operated more efficiently. For example, if the first row of stator blades 161 is circumferentially positioned or clocked such that one or more of the stator blades in that row is lined-up across from one of the injection ports 156, the cooling jets 220 from the injection port 156 may be used to cool the stator blade. This cooling of the stator blade may allow for the one or more of the following operating efficiencies to be realized. First, the part life of the stator blade may be extended because it does not experience the high temperatures that it would have experienced except for the cooling jet 220. Second, less cooling air may be needed for circulation through the stator blade to cool it during operation. As described, the cooling air that is circulated through stator blades is bled from the compressor and dumped into the main flow after passing through the stator blade. As one of ordinary skill in the art will appreciate, dumping bled compressor air into the main flow reduces the efficiency of the turbine engine. Third, the stator blades that are cooled by the cooling jets 220 may be made from less expensive materials because operational temperatures would generally be reduced. Fourth, turbine engines with higher firing temperature may be designed without new material advances because the cooling jets 220 would mitigate the higher temperatures. Of course, higher turbine firing temperatures generally translate into greater engine efficiency. As one of ordinary skill in the art will appreciate, other operational benefits may be realized by clocking configurations that better utilize the flow of the cooling jets 220.

FIGS. 6 and 7, as described in more detail below, illustrate schematic representations of clocking configuration according to exemplary embodiments of the present invention. As described, FIGS. 6 and 7 includes three rows of airfoils shown side-by-side: the first row of stator blades 161; the first row of rotor blades 163; and the second row of stator blades 163. Also, the first row of stator blades 161 and the second row of stator blades 163 are fixed and have substantially no relative motion between each other and the injection port 156, which is also fixed, during operation. Thus, a clocking relationship may be established between these components. To better define these clocking relationships, two additional points of reference should be identified. First, a leading edge 222 is the upstream edge of the airfoils. Second, an injection port midpoint 224 is the midpoint of the injection port 156.

In FIG. 6, according to an exemplary embodiment of the current application, the leading edge 222 of one of the stator blades 128 in the first row of stator blades 161 may be clocked such that it is positioned at approximately the same circumferential position as the injection port midpoint 224. Positioned in this location, as generally shown in FIG. 6, the flow of cooling air from the injection port 156 may flow over the stator blade 128 and cool it, as described in greater detail above. Analytical modeling and experimental data have confirmed that a stator blade 128 in this position experiences a significant reduction in thermal load during operation. In addition, it has been determined that the exact positioning of the stator blade 128 is not critical for significant reductions in thermal load to be achieved. More specifically, significant reductions in thermal load may be achieved where the leading edge 222 of the stator blade 128 is positioned within +/−15% pitch of the circumferential location of the injection port midpoint 224.

It will be appreciated that the injection ports 156 has two sides that define the circumferential boundaries of the port where the cooling air exits. On FIGS. 6 and 7, a first side 226 and a second side 228 is also referenced. Using the direction of rotation of the of rotor blades 126 of the first row of rotor blades 162 (i.e., the direction of arrow 164) to distinguish the relative circumferential locations of the first side 226 and the second side 228, the first side 226 may be described as being "upstream" from the second side 228. As shown in FIG. 7, according to an exemplary embodiment of the current application, the leading edge 222 of one of the stator blades 128 of the first row of stator blades 161 may be clocked such that it is positioned at approximately the same circumferential position as the first side 226 (i.e., the upstream side) of the injection port 156. Positioned in this location, as generally shown in FIG. 7, substantially all of the cooling jet 220 from the injection port 156 strikes the pressure side 230 of the stator blade 128 and, substantially, the cooling jet 220 is not bisected by the leading edge 222 of the stator blade 128. Having the cooling jet 220 remaining generally in tact (i.e., not bisected) in this manner allows the flow of cooling air to have a greater cooling impact downstream. Further, it has been determined that the exact positioning of the stator blade 128 in such an embodiment is not overly critical for beneficial results to be achieved. Thus, the leading edge 222 of the stator blade 122 may be positioned within +/−15% pitch of the circumferential location of the first side 226 of the injection port 156.

In some embodiments, a clocking relationship between the injection ports 156, the first row of stator blades 161, and the second row of stator blades 163 may be established such that additional operational benefits are achieved, including the cooling of additional rows of stator blades. As shown in FIG. 6, the cooling jets 220 are deflected by the first row of stator blades 161 and continues relatively intact to the second row of stator blades 163. As such, if the second row of stator blades 163 is configured such that a stator blade 128 meets the flow of the cooling jet 220, the stator blade 128 may be sufficiently cooled without the need for cooling air to be circulated through the interior cooling cavities of the blade or such that only a reduced flow of cooling air through the interior cooling cavities is required. In general, it has been found that the clocking configuration between the first row of stator blades 161 and the second row of stator blades 163 shown in FIG. 6 generally places a stator blade 128 in position to meet the cooling jet 220. As will be appreciated, the second row of stator blades 163 is offset by approximately 0% pitch in relation to the first row of stator blades 161. Thus, as illustrated, the circumferential position of a stator blade 128 in the second row of stator blades 163 lags the corresponding stator blade 128 in the first row of stator blades 161 by an offset of approximately 0% of the pitch measurement, which, of course, means that the stator blade in the second row of stator blades 163 maintains substantially the same circumferential position as the corresponding stator blade 128 in the first row of stator blades 161. As such, a leading edge of a stator blade 128 in the first row of stator blades 161 leads the leading edge of the corresponding stator blade 128 in the second row of stator blades 163 by a circumferential distance of approximately 0% of the pitch measurement, which means that the leading edges of the corresponding airfoils occupy substantially the same circumferential position. In addition, it has been determined that the exact positioning of the stator blade 128 in the second row of stator blades 163 is not critical for significant reductions in thermal load to be achieved. More specifically, significant reductions in thermal load (appreciably near the maximum thermal stress reduction level) may be achieved where the leading edge 222 of the stator blade 122 is positioned within +/−15% pitch of the 0% pitch value. That is, significant reductions in thermal load may be achieved where the first row of stator blades 161 and the second row of stator blades 163 maintains a clocking relationship of between 15% pitch and −15% pitch. As one of ordinary skill in the art will appreciate, subsequent rows of stator blades downstream of the second row of stator blades 163 may also be clocked in relation to the first row of stator blades 161 and the second row of stator blades 163 in a similar manner.

As illustrated in FIGS. 6 and 7, there might not be an equal number of injection ports 156 and stator blades 128 in the first row of stator blades 161 or the second row of stator blades 163. For example, in some embodiments, as shown, stator blades 128 may outnumber injection ports 156 by a 2-1 margin, i.e., two stator blades 128 for every one injection port 156. The same differential may be maintained in the second row of stator blades 163. In such embodiments, every other stator blade 128 may be cooled by a cooling jet 220 if a clocking relationship according to FIG. 6 or 7 is maintained. Other embodiments may include, for example, a 1-1 relationship between stator blades 128 and injection ports 156 such that every stator blade 128 may be cooled by the cooling jet 220 emanating from one of the injection ports 156. Other embodiments may include, for example, a 3-1 relationship between stator blades 128 and injection ports 156 such that every third stator blade 128 may be cooled by a cooling jet originating from one of the injection ports 156. Consistent with this, often, the number of stator blades 128 may be a whole number product of the number of injection ports 156. For example, if there are 12 injection ports, there might be 12, 24, 36, 48, 60 (and so on) stator blades 128 in the first row of stator blades 161 and/or the second row of stator blades 163 or the subsequent rows of stator blades. Note that the invention described herein may be employed in any situation where one or more stator blades 128 may be cooled by the upstream release of cooling air. The cooling of even a single stator blade 128, as described above, generally at minimum allows a reduction in the cooling air that is circulated through the stator blade 128 for cooling, and, thus, allows the turbine engine to function more efficiently.

In alternative embodiments, as one of ordinary skill in the art will appreciate, the clocking relationships between the inlet ports 156, the first row of stator blades 161, the second row of stator blades 163, and/or subsequent rows of stator blades may be determined through the use of three dimensional unsteady flow calculations and/or other similar methods. Such calculations may be used to predict the flow pattern of the cooling jet 220 from the injection port 156 through the several rows of airfoils for a given operating condition. Thus, the path of the cooling jet 220 may be predicted such that effective placement of the stator blades 128 may be achieved, i.e., placement that allows for enhanced cooling to occur.

As one of ordinary skill in the art will appreciate, the cooling jet 220 flows in a general axial direction upon exiting the injection port 156. Knowing the characteristics of the cooling jet 220 as it exits the injection port 156 and the distance between the injection port 156 and the first row of stator blades 161, an entry point into the first row of stator blades 161 may be calculated. Similar to the discussion above, in order to optimize the reduction in thermal stress to the first row of stator blades 161, one or more of the stator blades should be clocked such that, for example, the cooling jet 220 enters the first row of stator blades 161 at approximately the leading edge of the stator blade 128. At the first row of stator blades 161 the cooling jet 220 is deflected "upwards" such that it enters the first row of rotor blades 162 at an angle. Knowing the velocity and angle of the cooling jet 220, the path it takes from the injection port 156 to the location of the entrance it makes at the first row of rotor blades 162 may be calculated. As one of ordinary skill in the art will appreciate, known calculations of the flowvelocity? triangle establishes the cooling jet 220 through the rotor blades of the first row of rotor blades 162, leading to the direction and velocity of the cooling jet 220 leaving that row. As such, knowing the distance between the first row of rotor blades 162 and the second row of stator blades 163, an entry point into the second row of stator blades 163 may be calculated. Similar to the discussion above, in order to optimize the reduction in thermal stress to the second row of stator blades 163, one or more of the stator blades should be clocked such that, for example, the cooling jet 220 enters the second row of stator blades 163 at approximately the leading edge of the stator blade. (Note that other embodiments, such as having substantially all of the cooling jet 220 strike the pressure side of the stator blade 128, are also possible.) This will allow the cooling air to more effectively cool the stator blade. In addition, experimental data teaches that the precision of this location is not overly critical for appreciable benefits to be realized, and that locations within plus or minus 15% pitch of the optimum location may yield significant thermal stress reductions. As such, the one or more stator blades may be clocked such that the cooling jet enters the first or second row of stator blades at plus or minus 15% pitch of the leading edge 222.

As one of ordinary skill in the art will appreciate, three dimensional unsteady flow calculations can be performed to establish the cooling jet 220 leaving the injection ports 156, the cooling jets 220 entering and leaving the first row of stator blades 161, the cooling jets 220 entering and leaving the first row of rotor blades 162, and the cooling jets 220 entering and leaving the second row of stator blades 163. In addition, in some embodiments, this same process may be carried out for subsequent rows of stator blades such that enhanced cooling via the cooling jets 220 also is felt downstream.

As one of ordinary skill in the art will appreciate, for this calculation, the cooling jet 220 exiting the first row of stator blades 161 can be created by applying a calibrated surface shear model to the momentum equation as the source term. The flow of the cooling jet 220 can then be allowed to pass inviscidly through the first row of rotor blades 162 so that its trajectory can be seen with entropy contours. The cooling jet 220 is chopped by the relative motion of the first row of rotor blades 162 into discrete pulses that exit the passage at fixed circumferential locations relative to the first row of rotor blades 162. When the cooling jet 220 is time averaged, these pulses appear as a continuous stream into the second row of stator blades 163. It is these time average cooling jet flow entering the second row of stator blades 163 that may be used to establish the clocking of the second row of stator blades 163 (i.e., the circumferential positioning) with respect to the first row of stator blades 161.

As one of ordinary skill in the relevant art will appreciate, turbine engines generally operate at several different load levels or operating conditions depending on certain criteria. In analyzing the path of the wake flow and where it intersects or enters a downstream airfoil row, generally, in some embodiments, a determination of the path for one set of operating conditions may be different than that for another set of operating conditions. Thus, different sets of operating conditions might require different clocking relationships between the first and third airfoil rows (and, in some embodiments, the fifth airfoil row). As such, where the circumferential positioning of airfoils is fixed or time consuming to achieve, a desired operating condition might be selected and the airfoils rows clocked according to it. The chosen operating condition often may be a longest term operating condition so that the benefits are more significant.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A method of operating a turbine engine, wherein the turbine engine includes a compressor, a combustor, a turbine, a plurality of successive axially stacked stages that include a row of circumferentially spaced stator blades and circumferentially spaced rotor blades, and a plurality of circumferentially spaced injection ports disposed upstream of a first row of stator blades in the turbine; the injection ports comprising a port through which cooling air is injected into a hot-gas path of the turbine, the method comprising:
    configuring the stator blades in the first row of stator blades such that the circumferential position of a leading edge of one of the stator blades is located within +/−15% pitch of the first row of stator blades of the circumferential location of the injection port midpoint of each of the injection ports;
    wherein the combustor comprises can combustors and the injection ports are positioned between neighboring transition piece aft frames that, during operation, direct combustion product from the can combustors into the turbine.

2. The method according to claim 1, wherein the stator blades in the first row of stator blades are configured such that the circumferential position of the leading edge of one of the stator blades is located at the circumferential location of the injection port midpoint of each of the injection ports.

3. The method according to claim 1, further comprising the step of configuring the stator blades of a second row of stator blades with the stator blades of the first row of stator blades such that at least 90% of the stator blades of the first row of stator blades and at least 90% of the stator blades of the second row of stator blades comprise a clocking relationship of between approximately −15% and 15% pitch.

4. The method according to claim 3, wherein the stator blades of the second row of stator blades are configured such that at least 90% of the stator blades of the first row of stator blades and at least 90% of the stator blades of the second row of stator blades comprise a clocking relationship of approximately 0% pitch.

5. The method according to claim 3, further comprising the step of configuring the stator blades of a third row of stator blades with the stator blades of the second row of stator blades such that at least 90% of the stator blades of the second row of stator blades and at least 90% of the stator blades of the third row of stator blades comprise a clocking relationship of between −15 and 15% pitch.

6. The method according to claim 1, wherein
the injection ports expel cooling air that is used, at least in part, to cool the can combustors during operation.

7. The method according to claim 1, further comprising the step of configuring the stator blades in the first row of stator blades such that the circumferential position of the leading edge of one of the stator blades is located at the approximate circumferential location of an upstream side of each of the injection ports, wherein upstream is defined by the direction of rotation of a first row of rotor blades.

8. The method according to claim 1, wherein the number of stator blades comprises a whole number product of the number of injection ports, and wherein the whole number is greater than 1.

9. An assembly in a turbine engine, the turbine engine includes a compressor, a combustor, a turbine, a plurality of successive axially stacked stages that include a row of circumferentially spaced stator blades and circumferentially spaced rotor blades; the assembly comprising:
a plurality of circumferentially spaced injection ports disposed upstream of a first row of stator blades in the turbine, the injection ports comprising a port through which cooling air is injected into a hot-gas path of the turbine; and
wherein the first row of stator blades configured such that the circumferential position of a leading edge of one of the stator blades is located within +/−15% pitch of the first row of stator blades of the circumferential location of an injection port midpoint of each of the injection ports;
wherein the combustor comprises can combustors and the injection ports are positioned between neighboring transition piece aft frames that, during operation, are configured to direct combustion product from the can combustors into the turbine.

10. The assembly according to claim 9, wherein the stator blades in the first row of stator blades are configured such that the circumferential position of the leading edge of one of the stator blades is located at the approximate circumferential location of the injection port midpoint of each of the injection ports.

11. The assembly according to claim 9, further comprising a second row of stator blades;
wherein the stator blades of the second row of stator blades are configured such that at least 90% of the stator blades of the first row of stator blades and at least 90% of the stator blades of the second row of stator blades comprise a clocking relationship of between approximately −15% and 15% pitch.

12. The assembly according to claim 11, wherein the stator blades of the second row of stator blades are configured such that at least 90% of the stator blades of the first row of stator blades and at least 90% of the stator blades of the second row of stator blades comprise a clocking relationship of approximately 0% pitch.

13. The assembly according to claim 11, further comprising a third row of stator blades;
wherein the stator blades of a third row of stator blades are configured such that at least 90% of the stator blades of the second row of stator blades and at least 90% of the stator blades of the third row of stator blades comprise the clocking relationship of approximately 0% pitch.

14. The assembly according to claim 9, wherein the stator blades in the first row of stator blades are further configured such that the circumferential position of the leading edge of one of the stator blades is located at the approximate circumferential location of an upstream side of each of the injection ports, wherein upstream is defined by the direction of rotation of a first row of rotor blades.

15. The assembly according to claim 9, wherein the number of stator blades comprises a whole number product of the number of injection ports, and wherein the whole number is greater than 1.

* * * * *